(12) United States Patent
Groh

(10) Patent No.: US 6,588,376 B1
(45) Date of Patent: Jul. 8, 2003

(54) APPLIANCE FOR DISSUASION OF A DOG FROM BARKING

(75) Inventor: William S. Groh, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 0 days.

(21) Appl. No.: 10/082,667

(22) Filed: Feb. 25, 2002

(51) Int. Cl.[7] ............................................... A62B 35/00
(52) U.S. Cl. ....................................... 119/860; 119/718
(58) Field of Search ............................... 119/718, 856, 119/858; 239/152, 153, 154, 195, 355.16, 371; 222/211, 175; 424/411

(56) References Cited

U.S. PATENT DOCUMENTS

| | | | |
|---|---|---|---|
| 4,627,385 A | | 12/1986 | Vinci |
| 5,046,453 A | | 9/1991 | Vinci |
| 5,217,143 A | * | 6/1993 | Aitken ........................ 206/823 |
| 5,265,769 A | * | 11/1993 | Wilson ........................ 222/175 |
| 5,478,015 A | * | 12/1995 | Black ........................ 222/175 |
| 5,868,103 A | | 2/1999 | Boyd |
| 5,924,601 A | * | 7/1999 | Chen ........................... 222/175 |
| 5,961,003 A | * | 10/1999 | Coryell ........................ 222/175 |
| 5,967,415 A | * | 10/1999 | Utter ........................... 239/152 |
| 5,980,496 A | * | 11/1999 | Jacobsen et al. ............. 119/606 |
| 6,173,866 B1 | * | 1/2001 | Taylor et al. ................ 222/175 |
| 6,264,073 B1 | * | 7/2001 | Good et al. ................. 222/211 |
| 6,327,998 B1 | * | 12/2001 | Andre et al. ................ 119/712 |

* cited by examiner

Primary Examiner—Charles T. Jordan
Assistant Examiner—Susan Piascik
(74) Attorney, Agent, or Firm—Pitts & Brittian, P.C.

(57) ABSTRACT

In a device adapted to dissuade a dog from barking, there is provided a reservoir of spray material associated with a collar which encircles the dog's neck. The reservoir includes at least one wall member defining an interior volume for the receipt of spray material therein. The reservoir includes a first dimension (i.e., a centerline) which lies within the median sagittal plane of an erect dog which is facing forward, thereby orienting one portion of the interior of the reservoir vertically lowermost. An exit port is provided for the transport of spray material from the interior to the exterior of the reservoir. A semi-rigid, lengthwise substantially non-compressible, conduit having a first end thereof connected in fluid flow communication with the exit port, extends from the exit port and terminates at its opposite and open end at the vertically lowermost interior portion of the reservoir when the present appliance is mounted at a location on the collar beneath the lower jaw of the dog. The length of the conduit is chosen to exceed the straight-line distance between the exit port and the vertically lowermost portion of the reservoir by an amount sufficient to provide for wedging of the conduit against at least one interior wall of the reservoir opposite the exit port and preferably opposite to terminal open end of the conduit.

9 Claims, 4 Drawing Sheets

APPLIANCE FOR DISSUASION OF A DOG FROM BARKING

FIELD OF INVENTION

This invention relates to appliances adapted to train dogs to refrain from barking by discouraging barking through the means of an obnoxious odor or irritant sprayed onto or into the vicinity of the dog's nose upon the occasion of the dog barking.

BACKGROUND OF INVENTION

In the prior art, it has been proposed that a dog may be either trained to not bark or at least to discourage a dog from barking by detecting the bark of the dog and thereupon expressing into the vicinity of the dog's nose a spray of either a liquid or powdered material which is obnoxious to the dog. Commonly, the bark detector and the spray apparatus are secured to a collar which encircles the dog's neck. These appliances have proven to suffer shortcomings. For example, in the instance where the flow of the spray material from the reservoir is controlled by a solenoid functioning as a valve, when the spray material within the reservoir is not present at the exit port of the reservoir, the solenoid, in response to a detected barking by the dog, malfunctions and no material is sprayed from the reservoir. Moreover, the appliances suffer from the need for frequent replacement or replenishment of the source of the sprayable material due to the permissible size of the storage reservoir for the sprayable material.

In view of the relatively small volume of spray material which can be stored in a reservoir attached to the dog's collar, hence the frequency at which the reservoir will require refilling or replacement of a canister in the case of a pressurized canister of the spray material, it becomes important that the appliance provide for consumption of all or a maximum amount of the spray material which is held in the reservoir before a refilling or replenishment of the reservoir is needed. Moreover, in the instance where the spray material is contained within a pressurized canister, it is important from an economic standpoint that all of the spray material within the canister be dispensed before the canister is replaced. In any event, it is not desirable from a training standpoint that there be inconsistent dispensing of spray material at those times when the dog barks.

Irrespective of the location of the exit port of a reservoir of a spray material, the level of spray material within a reservoir, whether pressurized or not, is a function of the orientation of the reservoir attached to the dog's collar, with the orientation of the dog's collar being a function of the orientation of the dog's neck at any given time. Obviously, these degrees of orientation vary quite widely and often, but most frequently, the orientation of the plane occupied by a collar encircling a dog's neck will assume at least a semi-vertical orientation aside from those times when the dog is lying on its side with its head aligned with its body. And dogs do not commonly bark when so reclining so that activation of the spray mechanism is not required under such circumstances.

SUMMARY OF THE INVENTION

In accordance with one aspect of the present invention, in an appliance adapted to dissuade a dog from barking, there is provided a reservoir of spray material associated with a collar which encircles the dog's neck. The reservoir, in a preferred embodiment, includes at least one wall member defining an interior volume for the receipt of spray material therein. The reservoir includes a first dimension (i.e., a centerline) which lies within the median sattital plane of an erect dog which is facing forward as depicted in FIG. 1 thereby orienting one portion of the interior of the reservoir vertically lowermost.

An exit port is provided for the transport of spray material from the interior to the exterior of the reservoir. Most commonly, the reservoir further includes an inlet port for refilling the reservoir with the sprayable material. A semi-rigid, lengthwise substantially non-compressible conduit, having a first end thereof connected in fluid flow communication with the exit port, extends from the exit port and terminates at its opposite and open end at the vertically lowermost interior portion of the reservoir when the present appliance is mounted at a location on the collar beneath the lower jaw of the dog. The length of the conduit is chosen to exceed the straight-line distance between the exit port and the vertically lowermost portion of the reservoir by an amount sufficient to provide for wedging of the conduit against at least one interior wall of the reservoir opposite the exit port and preferably opposite the terminal open end of the conduit.

In a preferred embodiment, the reservoir of the appliance includes first and second opposite ends and four side walls which define a reservoir of substantially rectangular geometry. In this preferred embodiment, one of the end walls of the reservoir is disposed within a plane which is inclined relative to a horizontal transverse plane of the erect dog which is facing forwardly as depicted in FIG. 1, when the reservoir is oriented angularly with respect to the median sagittal plane of the erect dog as noted above. In like manner, where the reservoir is of a hollow cylindrical geometry or other elongated geometry, one of the end walls of the reservoir is disposed within a like plane. Similarly, where the reservoir comprises a hollow spherical geometry, and a diameter of the reservoir is oriented angularly with respect to the vertical as noted above, there will be a portion of the reservoir which is lowermost relative to the vertical and, in this instance, lowermost relative to the horizontal.

Irrespective of the location of the exit port of spray material from the reservoir, in accordance with the present invention the conduit is fully contained within the reservoir and extends from the exit port to a location adjacent that portion of the reservoir which is disposed vertically lowermost when the reservoir is associated with the dog's collar, the collar is disposed in encircling relationship to the dog's neck and the dog's head is held erect when barking.

A first end of the conduit is connected in fluid communication with the exit port and the second and opposite end is open for the flow of spray material from the reservoir into the conduit. To ensure both the initial and continued positioning of the open end of the conduit adjacent the vertically lowermost portion of the reservoir, the conduit is chosen to be of a length which permits bending or otherwise shaping of the conduit into at least a partial loop which extends from the exit port to engage at least one internal side wall of the reservoir opposite the exit port, thence along and engaging at least a portion of the length dimension of the internal side wall, thence in a direction away from the internal side wall and toward said vertically lowermost portion of the reservoir. The open end of the conduit terminates within or immediately adjacent the vertically lowermost portion of the reservoir, in position to be in fluid communication with the spray material of a full or partially full reservoir, or with even a minimal volume of spray material contained only within the vertically lowermost portion of the reservoir.

DETAILED DESCRIPTION OF INVENTION

Like or identical components of the present invention are indicated with prime numerals.

Figure 1:
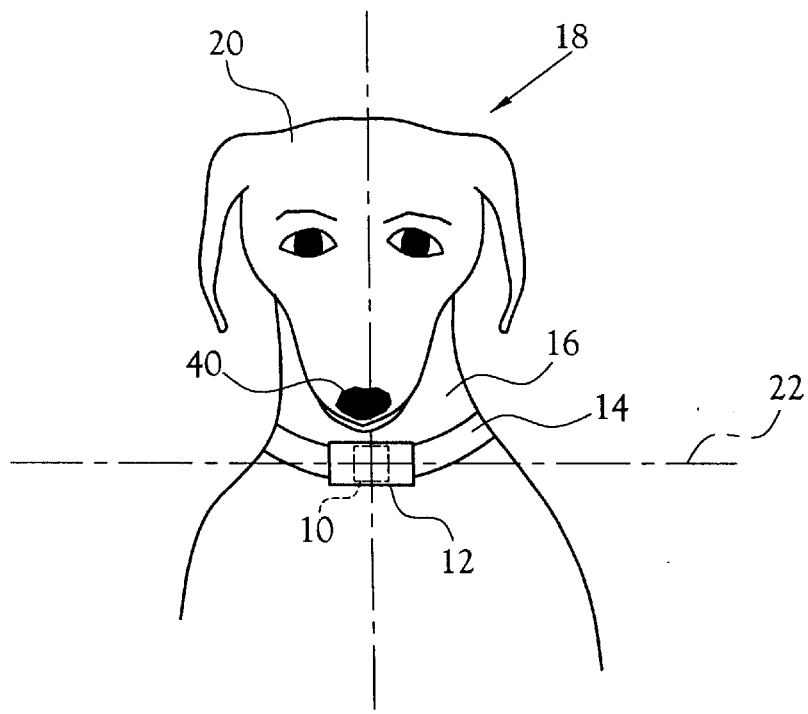
FIG. 1 is a representation of a dog having a device, which houses an appliance of the present invention, disposed on a collar which encircles the neck of the dog.
Figure 2:
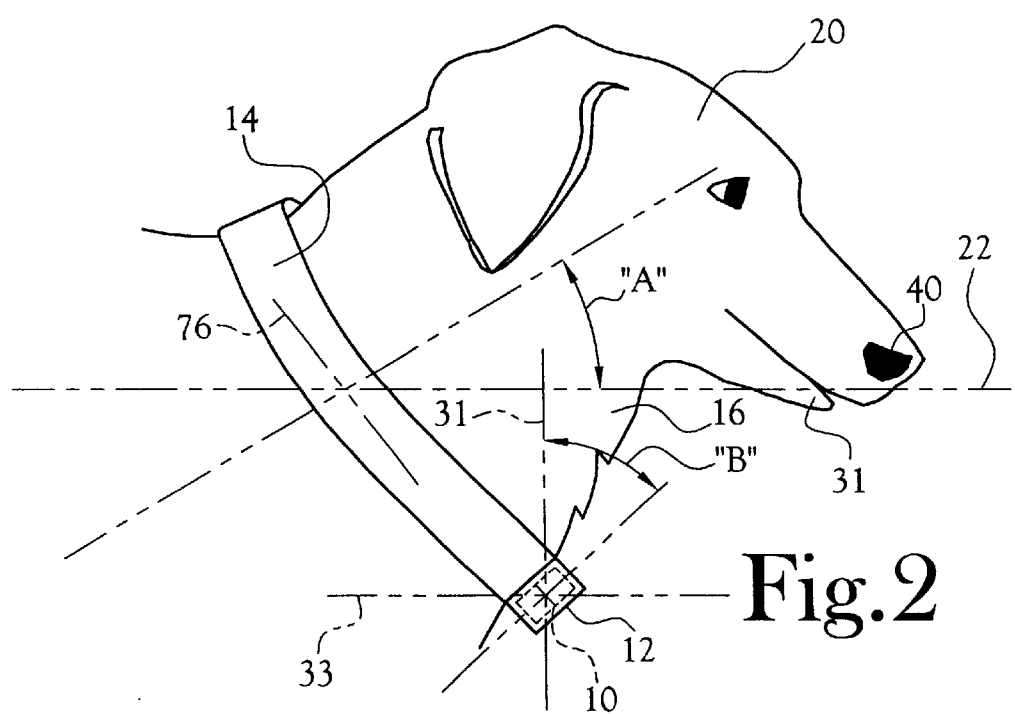
FIG. 2 is a side plan view of the dog represented in FIG. 1.

Referring to FIGS. 1 and 2, in accordance with the present invention, there is provided an appliance 10 useful in a device 12 adapted to be mounted on a collar or the like 14 which encircles the neck 16 of a dog 18. As noted in FIG. 1, the most common position of a barking dog is an erect position as depicted in FIG. 1. In this position, the dog's neck 16 is aligned such that the centerline 24 (FIG. 2) of its neck 26 is oriented at an angle "A" of not greater than about 90 degrees with respect to the horizontal 22, thereby orienting the plane of the collar, hence the centerline of the appliance 10, at an angle "B", which is not greater than about 90 degrees with respect to the horizontal 33.

Referring to the several Figures, in accordance with one aspect of the present invention, the appliance 10 of the present invention is mounted in a housing 29 which, in turn, is affixed to the collar 14 at a location under the lower jaw 31 of the erect dog. The appliance 10 of the present invention comprises a reservoir 30, which in the embodiment depicted in FIG. 4, includes first and second end walls, 32,34, first and second side walls 36,38, and a bottom wall 44, respectively. These wall combine with a top wall 46 which in the depicted embodiment comprises a top cover for the reservoir to define the reservoir 30 for the receipt of a sprayable material 50, either a liquid or a powder, therein. The depicted reservoir includes an inlet port 52 (FIG. 5) which is adapted to provide access from the exterior to the interior of the reservoir for the introduction of sprayable material into the reservoir. Expulsion of the spray material from the reservoir is provided for by means of an exit port 54 disposed in one of the walls or in the top or bottom of the reservoir, preferably in a side wall 36 of the reservoir.

In one embodiment, there is provided externally of the reservoir a solenoid 56 which functions as a valve to control the outflow of sprayable material from the exit port 54 of the reservoir to an inlet port 51 associated with the solenoid, thence to a region adjacent the nose 40 of the dog. As is well known in the art, actuation of the solenoid is in response to the barking of the dog.

Within the interior volume of the reservoir 30, in accordance with the present invention, there is provided a length of a substantially lengthwise-non-compressible, bendable conduit 62 having first and second ends 64, 66. The first end 64 of the conduit is connected in fluid communication with the exit port 54. The second end 66 of the conduit is open.

Figure 3:
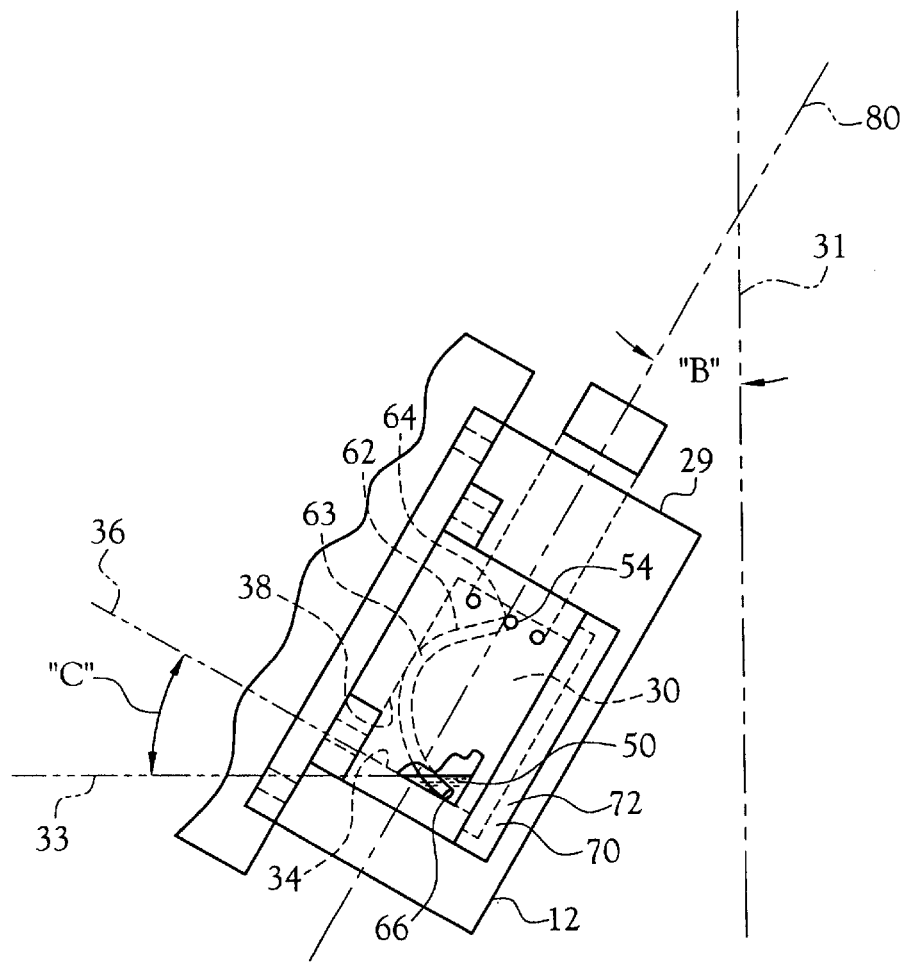
FIG. 3 is a side plan view of the appliance depicted in FIG. 2.
Figure 4:
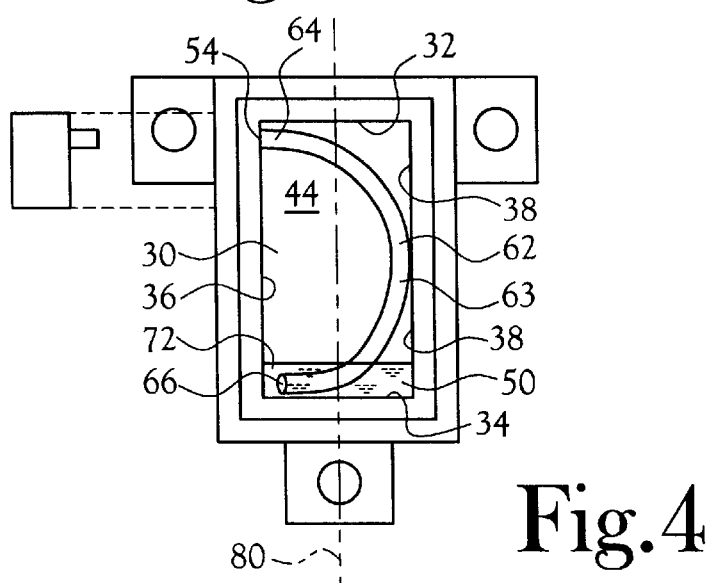
FIG. 4 is a front plan view of the appliance depicted in FIGS. 1 and 2, with the top cover (wall) removed therefrom.
Figure 5:
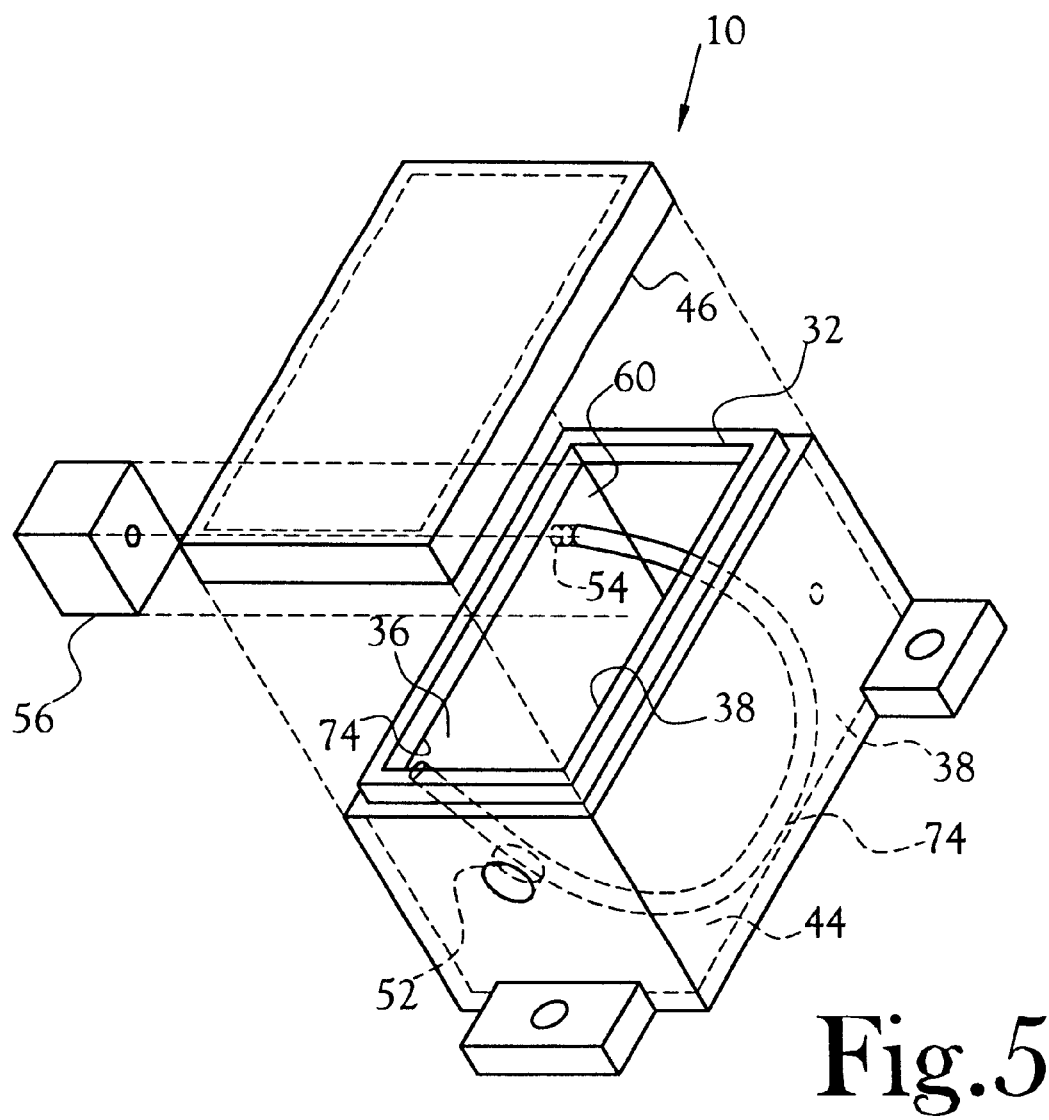
FIG. 5 is a representation of one embodiment of an appliance embodying various of the features of the present invention.

As depicted in FIGS. 3–5, the conduit 62 leads from the exit port toward an opposite side wall 36. A portion 63 of the length of the conduit engages such opposite side wall 38 and extends along this side wall in a direction toward the end wall 34 of the reservoir, thence the conduit extends away from the side wall 38 toward a corner 70 of the reservoir defined by the side wall 38, the bottom wall 44 and the end wall 34 of the reservoir thereby defining a pocket 72 for the receipt of sprayable material 50 therein. The open end 66 of the conduit 62 terminates within or contiguous to this pocket and in position to access even a minimal volume of sprayable material 50 disposed within the pocket. By this alignment and positioning of the substantially non-compressible (lengthwise) conduit within the reservoir, the conduit is wedged within the reservoir and thereby stabilized to the extent that the open end of the conduit cannot be inadvertently dislodged from its position within the reservoir, hence the position of the open end of the conduit within the pocket, even when the dog is active, excited and/or shakes its head.

In one embodiment, that portion 63 of the length of the conduit which extends to and along the side wall 38 is also captured within the junction 74 of the side wall 38 and the bottom wall 44 of the reservoir, thereby further enhancing the stability of position of the conduit within the reservoir, even when the dog may be shaking or moving its head, as when the dog is excited. Further, in one embodiment, the length of the conduit exceeds the distance measured from the exit port to an opposite wall, thence along such opposite wall, thence to a corner of the reservoir most distant from the exit port. Preferably the length of the conduit is at least 1.25 times the length dimension of the reservoir as measured along the longitudinal centerline of the reservoir.

Most commonly, a barking dissuasion device for a dog is mounted on a collar which encircles the neck of the dog. This collar is fitted sufficiently snugly about the dog's neck as causes the collar to reside in a plane 76 which is substantially perpendicular to the longitudinal centerline 24 of the dog's neck (see FIG. 2). This relationship of the collar and the dog's neck does not materially change. The housing 29, hence the appliance of the present invention contained therein, may be mounted directly to the collar with the longitudinal centerline of the appliance aligned substantailly perpendicular to the plane occupied by the collar, and as so mounted, the pocket 72 of the reservoir 30 is disposed at the vertically lowest position possible. By this means, the pocket of the reservoir of the present appliance at substantially all material times is positionally available for the flow, by gravity, of sprayable material within the reservoir into the pocket where such sprayable material is accessible by the open end of the conduit.

Such orientation of the reservoir of the present invention is provided by mounting the appliance to the collar such that when the collar is affixed about the dog's neck, the longitudinal centerline 80 of the reservoir 30 is disposed substantially parallel to the longitudinal centerline 24 of the dog's neck and at an angle "B" not exceeding 90 degrees relative to the vertical 31 as seen in FIG. 3. Moreover, the orientation of the appliance on the collar (or on a dissuasion device on the collar), hence the reservoir, is chosen such that the pocket 72 defined within the reservoir defines the vertically lowest portion of the interior volume of the reservoir. This may be accomplished by orienting the appliance on the collar as noted hereinabove and with that end wall 34 which partially defines the pocket being oriented most vertically lowest of the end walls when the appliance is initially mounted on the collar at a position along the side of the dog's neck as depicted in FIG. 1. When the present appliance is angularly oriented with respect to the vertical as noted hereinabove and the end wall associated with the pocket is located most vertically lowest of the end walls, the plane 82 occupied by such lowest end wall will, at most material times such as when the dog is barking, be oriented at an acute angle "C" with respect to the horizontal 33 (FIG. 2), thereby causing the pocket within the reservoir to at all material times be located at the most vertically lowest level of the reservoir.

Whereas the pocket of the present appliance is described and depicted as being in a particular corner of reservoir, it will be recognized that the open end of the conduit may terminate adjacent either corner, or even intermediate the opposite corners defined by the cooperation of an end wall, a side wall and the top wall of the reservoir. Still further, whereas the conduit of the present appliance is described as being bendable, the may be formed of a rigid tube which is initially formed to an appropriate geometry. One suitable material of construction for the tube is polypropylene.

Figure 6:
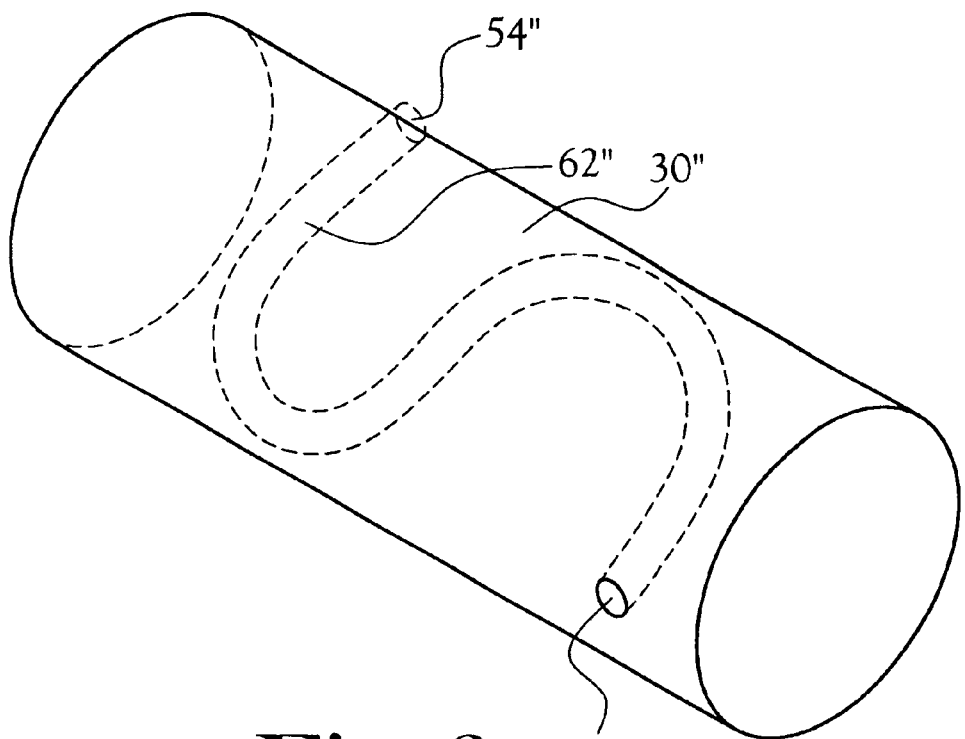
FIG. 6 is a sectional view taken along a diameter of a reservoir of a hollow spherical geometry; and, FIG. 7 is a representation of a reservoir of a hollow cylindrical geometry.
Figure 7:
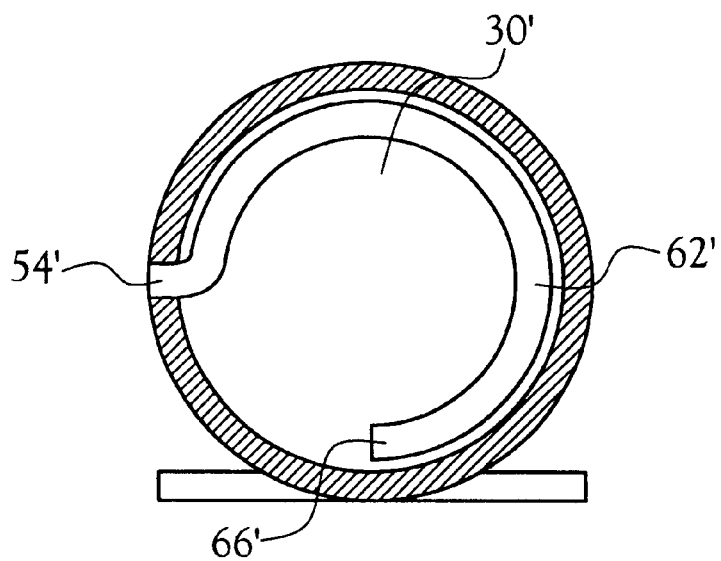

It will be further recognized that the reservoir of the present invention may be defined with any of a variety of geometries. For example, FIGS. 6 and 7 depict two alternative embodiments of the reservoir, namely a reservoir 30' of a hollow spherical geometry as depicted in FIG. 6 and a reservoir 30" of a hollow cylindrical as depicted in FIG. 7.

Further, as depicted in Figures the conduit 62' may assume any of a variety of pathways between the exit port 54',54" of the reservoir 30',30", so long as in each embodiment the conduit is fixedly retained with its open 66', 66" adjacent the vertically lowest portion of a respective reservoir.

What is claimed:

1. In an appliance for dissuading a dog from barking,
    a reservoir for a sprayable material,
    said reservoir having an inlet port for the introduction of sprayable material into said reservoir, an exit port for the exit of sprayable material from said reservoir, and one or more inside walls defining an interior cavity of said reservoir, said one or more inside walls defining a pocket within said reservoir for receiving and accumulating, sprayable material therein,
    a transfer conduit having first and second ends, said first end being in fluid communication with, and terminating at, said exit port and said second end being open and terminating within said pocket, whereby said transfer conduit is disposed essentially wholly within said reservoir,
    a mounting platform disposed on the dog's neck,
    said reservoir being mounted on said platform with its pocket disposed most vertically lowest of the remainder of said reservoir when the head of the dog is substantially erect, whereby sprayable material within said reservoir flows toward said pocket.

2. The appliance of claim 1 wherein said reservoir includes a longitudinal centerline and when said appliance is mounted on said platform, said longitudinal centerline of said reservoir is oriented at an angle not greater than 90 degrees with respect to the vertical when the dog's head is substantially erect.

3. The appliance of claim 1 wherein said conduit is of a bendable material having minimal longitudinal compressibility.

4. The appliance of claim 1 wherein said conduit is of a length which is substantially in excess of the length of a straight line between said exit port and said pocket.

5. The appliance of claim 4 wherein said conduit engages at least one portion of said one or more interior walls of said reservoir at a location intermediate said first and second ends of said conduit.

6. In a reservoir having first and second opposite ends, an exit port, and adapted to receive therein a sprayable material associated with a device for dissuading a dog from barking, the improvement comprising
    a conduit having first and second ends, said first end being in fluid communication with the exit port and said second end extending to a location within said reservoir which is vertically most lowest when the dog's head is in an erect attitude.

7. The improvement of claim 6 wherein said conduit is bendable and substantially non-compressible at least in the direction of the length of said conduit.

8. The improvement of claim 6 and including a pocket for the receipt of sprayable material within said reservoir flowing by gravity toward said pocket.

9. The improvement of claim 6 wherein said reservoir is mounted on a collar encircling the neck of a dog and includes a longitudinal centerline and said reservoir is mounted on said collar at a location substantially beneath the lower jaw of the dog.

* * * * *